May 28, 1957 J. OSWALD 2,794,072

SIGNALLING SYSTEMS FOR PULSE TELECOMMUNICATION SYSTEM

Filed March 18, 1952 3 Sheets-Sheet 1

INVENTOR:
JACQUES OSWALD
BY:
Michael S. Striker
Agent

May 28, 1957 J. OSWALD 2,794,072

SIGNALLING SYSTEMS FOR PULSE TELECOMMUNICATION SYSTEM

Filed March 18, 1952 3 Sheets-Sheet 2

INVENTOR:
JACQUES OSWALD
BY:
[signature]

INVENTOR:
JACQUES OSWALD
BY:
Michael S. Striker
Agent

United States Patent Office 2,794,072
Patented May 28, 1957

2,794,072

SIGNALLING SYSTEMS FOR PULSE TELECOMMUNICATION SYSTEM

Jacques Oswald, Paris, France, assignor to Compagnie Industrielle des Telephones, Paris, France, a corporation of France Application March 18, 1952, Serial No. 277,235
Claims priority, application France April 17, 1951
3 Claims. (Cl. 179—15)

The present invention relates to signalling systems for pulse telecommunication systems with one or more channels.

In the multi-channel or multiplex systems, as is well known, there corresponds to each channel an impulse having a predetermined repetition period $$T=\frac{1}{F}$$

the voice current modulation being translated by a variation of the amplitude, or the duration or of the time of appearance of the pulse.

In the majority of the well-known systems, the signalling is carried out by the transmission of a particular voice frequency which modulates the impulse under the same conditions as the voice currents, or again by partial or total suppression of the channel impulse.

The present invention makes it possible to overcome the difficulties encountered in making the call by voice frequency, particularly the untimely releases or lack of sensitivity of the ringers.

The object of the present invention is a method of signalling for a pulse transmission system, characterised in this, that the transmission of a signalling current on a transmission channel employing a series of impulses of frequency F, causes the suppression of one impulse in two in the series of said channel impulses, so as to transmit the frequency F/2 and its odd multiples during the period of transmission of the signal currents.

The spectrum of a series of periodic impulses of frequency F comprises the frequency lines F, 2F, 3F . . . $n$F, etc. the amplitude of which lines decreases very slowly with the degree, when the duration of the pulses is small as compared with the repetition period T. In the absence of signalling current, the spectrum of the pulses modulated or unmodulated by the voice currents will chiefly comprise the harmonics of the frequency F, if need be with the modulation side bands, of much lower amplitude. On the other hand, during the period of transmission of the signalling currents, the spectrum of the transmitted impulses will chiefly comprise the frequencies F/2, F, 3F/2, 2F, $$\frac{5F}{2} \cdots p\frac{F}{2}$$

etc. The appearance of any one of the odd multiple frequencies of F/2 characterises the signalling, so that in the receiving device, the selection of any one of these frequencies, for example 3F/2, releases, after amplification and detection, the call receiving relay.

The characteristics of the invention will appear from the following description of an example of the application of the invention to multiplex systems, with reference to the attached drawings, in which.

Figure 1:
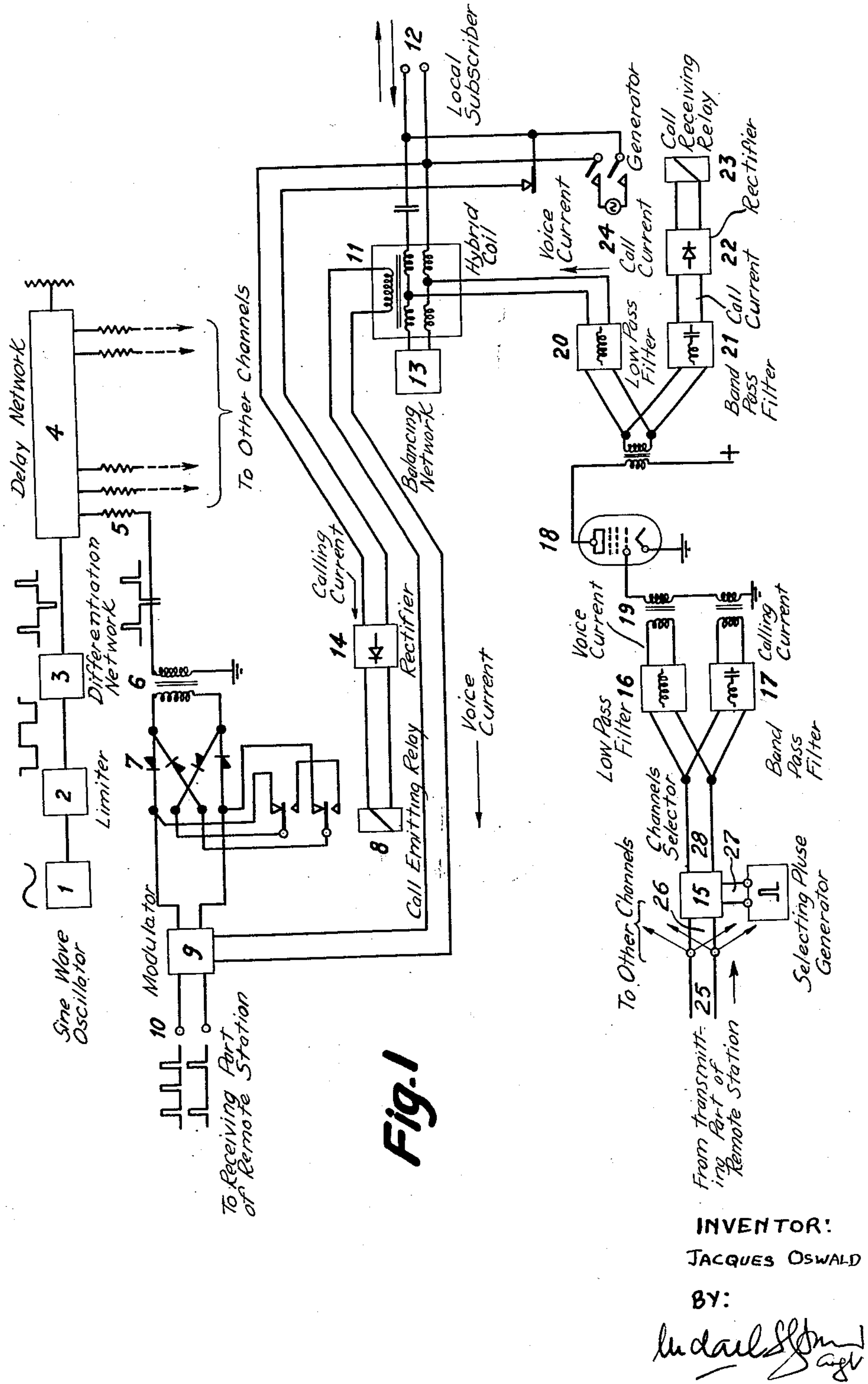
Fig. 1 shows the circuit diagram of a device utilising the method of signalling in accordance with the invention.

In the diagram of Fig. 1, 1 represents a sinusoidal oscillator at the frequency F/2, for example 4 kcs. if the repetition frequency F be fixed at 8 kcs. 2 is a limiter comprising, for example, a valve, and transforming the sinusoidal oscillation of frequency F/2 into a rectangular wave of the same frequency. 3 is a device for deviation in relation to time comprising for example a network with time constant or a retardation line having one end short-circuited and transforming the rectangular wave into short, alternately positive and negative impulses.

Figure 2:
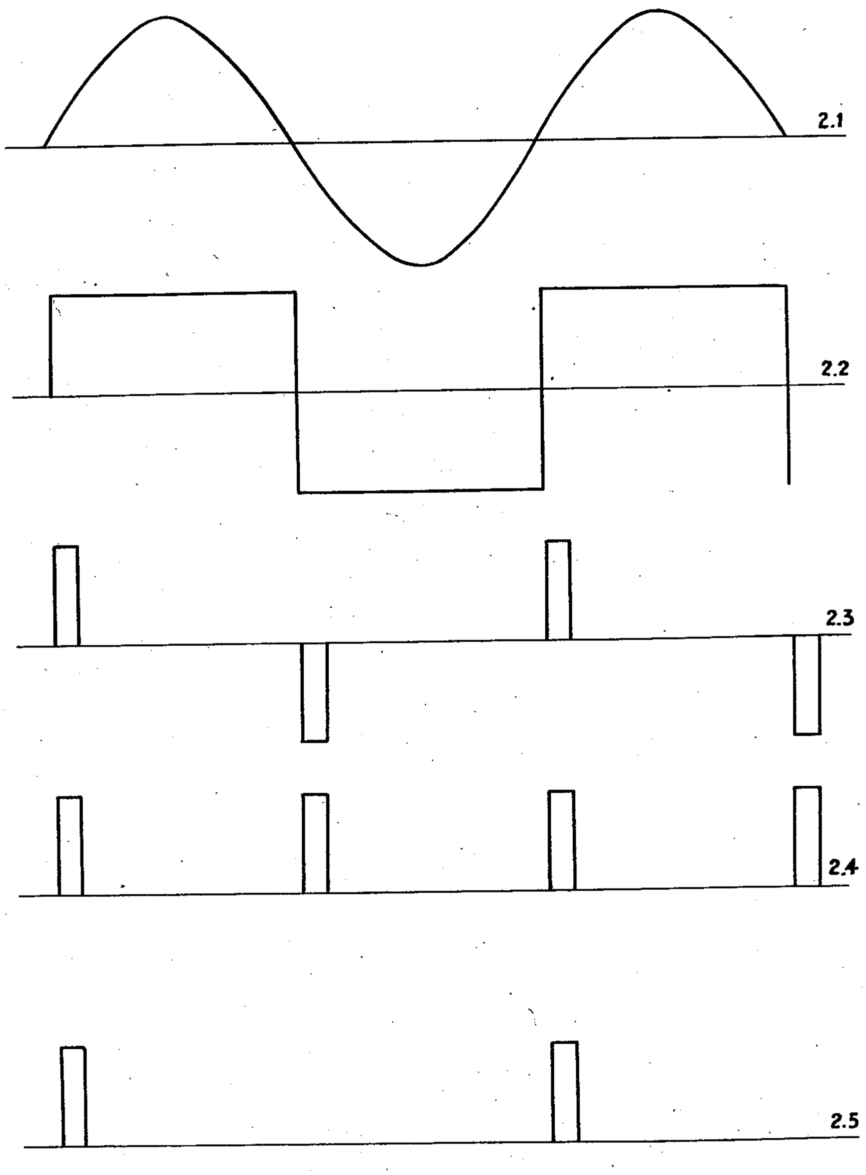
Fig. 2 shows a graph of the transformation of the channel currents in the members of the transmitting device of Fig. 1.

The interval between two successive impulses of opposite polarity is $T=125$ microseconds, in the example chosen. Fig. 2 shows the transformation of the sinusoidal oscillation in the members 1, 2 and 3 (series 2.1, 2.2 and 2.3).

4 is a retardation line which staggers in time the impulses of double polarity, the tappings 5 making it possible to take off the currents corresponding to the various channels through a resistance. The channel impulse is applied through a transformer 6 to the rectifier bridge 7 of which the connections depend on the ringing relay 8.

In the absence of signalling current, the relay 8 is at the normal position, and the connections ensured by its rest contacts are such that the positive pulses reach a channel modulator 9 without alteration, and that the negative pulses are rectified before being applied to the modulator. The modulating impulses are therefore in this case in conformity with the series 2.4 shown in Fig. 2. The modulator 9 may be any member whatsoever supplying at its output terminals 10 impulses which are modulated in amplitude, duration or position, when it receives on the one hand the impulses coming from the rectifier bridge 7 and on the other hand the voice currents coming from a differential transformer 11 associated with the two-wire line 12 and terminated by a balancing network 13. The terminals 10 are connected to means for communicating with the receiver portion of the associated station by means of an unillustrated mixing apparatus for the impulses coming from the different channels.

When a signalling current is transmitted at 12 the relay 8 energised by the currents rectified by the rectifier 14 pulls up and its make contacts modify the connections of two of the rectifiers of the bridge 7. The connections ensured are such that the impulses of positive polarity are not disturbed, while the negative impulses are eliminated, two of the rectifiers playing the part of short circuit. In these conditions we find on the output terminals 10 of the modulator 9 positive impulses at intervals of 2T (250 microseconds in the example chosen) in accordance with the series 2.5 of Fig. 2.

Figure 3:
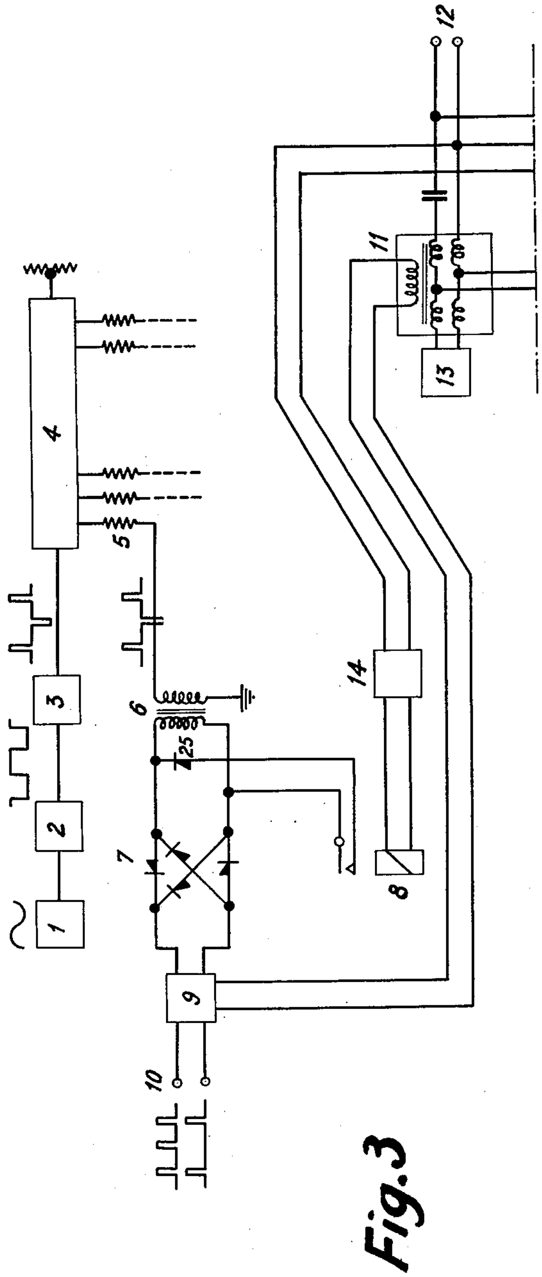
Fig. 3 shows another form of the member eliminating one impulse in two in the series of channel impulses.

It is noteworthy that the blocking and rectifying operations can be carried out in separate members, the connections of the blocking member alone being dependent on the position of the call transmitting relay. Such an arrangement is shown in Fig. 3, where it will be seen that the armature of the call-transmission relay 8 closes in its "operative" position, on the terminals of the secondary winding of the transformer 6, a shunt comprising rectifiers 25, which place the impulses of the direction to be eliminated in short-circuit.

The call-transmitting relay may, of course, be replaced by a static blocking device controlled by the ringing current.

In the receiving device, the duration-modulated or amplitude-modulated channel pulses coming from the corresponding transmitting station and received at the terminals 25, are applied to the input terminals 26 of different channel selectors 15, that also receive on its terminals 27 a selection pulse characteristic of the channel concerned. The selector may be of any kind, for example, a device with valves or a blocking device with rectifier cells. The channel pulse selected at 28, is applied to a low-pass filter 16 and to a band-filter 17 arranged in parallel.

When the voice currents modulate the channel impulses of frequency F (here 8 kcs.) the filter 16 separates the telephone modulation which is applied to the grid of a valve 18 by means of a transformer 19. After amplification the voice currents pass into a low-pass filter 20 of which the cut-off frequency is 4 kcs., and are sent on the differential 11 of the line 12. The band filter 17 tuned to the frequency 3F/2 (here 12 kcs.) only receives very weak currents which only come from the components at 4 kcs. of the voice currents, transposed to 12 kcs. in the upper band of modulation associated with the frequency F.

Thus the band filter 21 tuned to 3F/2 (12 kcs.) is traversed by an extremely weak current which cannot, after passing into a rectifier 22 energise a call receiving relay 23.

When a signalling current is emitted by a subscriber, the frequency of repetition of the impuses selected at 15 is F/2. The filter 16 slightly attenuates the frequency F/2, the filtering effect being completed by the filter 20. On the other hand the filter 17 passes the frequency 3F/2 (12 kcs.) which is amplified by the valve 18 before passing into the band-pass filter 21 and energising, after detection, the relay 23 which controls the closing on the line 12 of a local source 24 and the opening of the circuit of ringing relay 8.

According to another embodiment, the call-transmitting device remaining the same, the filter 17 of the receiving system is eliminated and the filter 16 is established in order to pass the frequency F/2 (4 kcs.). The currents of frequency F/2 energise the relay 23 after passing in the filter 21 tuned to 4 kcs. The call is thus made at a frequency F/2 of the voice band. The device, however, has a great advantage over that which consists in modulating the transmission pulses at 4 kcs. In effect, the amplitude of the component F/2 (4 kcs.) is incomparably higher (in a ratio of several nepers) when one impulse in two is suppressed than when the impulse of frequency F is modulated by a frequency F/2, because in the latter case the rate of modulation is of necessity very low in order to prevent distortions and cross-talk.

The method and devices described above may also be applied in the case of a single-channel link.

What is claimed is:

1. In a transmitting station of a multi-channel installation for voice transmission by electrical impulse signals in which the impulse signals for each voice transmission in each channel are emitted with a repetition frequency F, and in which the calling signals for each channel are obtained by suppressing every other impulse signal, in combination, an impulse generator for providing a series of alternately positive and negative electrical impulses at a repetition frequency F, said impulse generator having output terminals; a calling relay having a plurality of fixed contacts and a plurality of movable contacts, said movable contacts being movable between at least two different positions in each of which said movable contacts engage different ones of said fixed contacts; and a plurality of rectifiers connected in circuit between said output terminals of said impulse generator and said contacts of said calling relay in such manner that, in one position of said movable contacts, said rectifiers suppress all of the impulses of one polarity emitted from said impulse generator and in the other position of said movable contacts of said calling relay, said rectifiers invert all of the impulses of said one polarity.

2. In a transmitting station of a multi-channel installation for voice transmission by electrical impulse signals in which the impulse signals for each voice transmission in each channel are emitted with a repetition frequency F, and in which the calling signals for each channel are obtained by suppressing every other impulse signal, in combination, an impulse generator for providing a series of alternately positive and negative electrical impulses at a repetition frequency F, said impulse generator having output terminals; a calling relay having a plurality of fixed contacts and a plurality of movable contacts, said movable contacts being movable between at least two different positions in each of which said movable contacts engage different ones of said fixed contacts; and a plurality of rectifiers connected in circuit between said output terminals of said impulse generator and said contacts of said calling relay in such manner that, in one position of said movable contacts, said rectifiers are connected in a bridge circuit and in the other position of said movable contacts of said calling relay, at least two of said plurality of rectifiers are connected in series across the output terminals of said impulse generator.

3. In a transmitting station of a multi-channel installation for voice transmission by electrical impulse signals in which the impulse signals for each voice transmission in each channel are emitted with a repetition frequency F, and in which the calling signals for each channel are obtained by suppressing every other impulse signal, in combination, an impulse generator for providing a series of alternately positive and negative electrical impulses at a repetition frequency F, said impulse generator having output terminals; a calling relay having at least one contact; a plurality of first rectifiers connected as a bridge circuit to said output terminals of said impulse generator; and a second rectifier connected between said output terminals of said impulse generator and said contact of said calling relay so that said second rectifier may be connected across said output terminals whenever desired.

References Cited in the file of this patent

UNITED STATES PATENTS

| | | |
|---|---|---|
| 2,539,497 | Treadwell | Jan. 30, 1951 |
| 2,613,279 | Hurault | Oct. 7, 1952 |